United States Patent
Chang et al.

(10) Patent No.: US 9,100,091 B2
(45) Date of Patent: Aug. 4, 2015

(54) FRAMING MECHANISM FOR TIME-DIVISION-DUPLEX OFDM COMMUNICATION SYSTEMS

(71) Applicant: Metanoia Communications Inc., Hsinchu (TW)

(72) Inventors: Chun-Che Chang, Hsinchu (TW); Sam Mungall, Hsinchu (TW)

(73) Assignee: Metanoia Communications Inc. (TW)

( * ) Notice: Subject to any disclaimer, the term of this patent is extended or adjusted under 35 U.S.C. 154(b) by 129 days.

(21) Appl. No.: 13/875,279

(22) Filed: May 1, 2013

(65) Prior Publication Data

US 2013/0294298 A1  Nov. 7, 2013

Related U.S. Application Data (60) Provisional application No. 61/641,199, filed on May 1, 2012.

(51) Int. Cl.
  *H04B 7/26* (2006.01)
  *H04L 27/26* (2006.01)
  *H04L 9/00* (2006.01)
  *H04L 12/28* (2006.01)
  *H04L 5/00* (2006.01)

(52) U.S. Cl.
  CPC ........... *H04B 7/2603* (2013.01); *H04B 7/2656* (2013.01); *H04L 27/2602* (2013.01); *H04L 5/0007* (2013.01); *H04L 9/00* (2013.01); *H04L 12/28* (2013.01)

(58) Field of Classification Search
  None
  See application file for complete search history.

(56) References Cited

U.S. PATENT DOCUMENTS

| | | | |
|---|---|---|---|
| 2007/0242600 A1* | 10/2007 | Li et al. | 370/210 |
| 2009/0023453 A1* | 1/2009 | Hu et al. | 455/452.1 |
| 2009/0245340 A1* | 10/2009 | Sorbara et al. | 375/227 |
| 2010/0260164 A1* | 10/2010 | Moon et al. | 370/345 |
| 2011/0033048 A1* | 2/2011 | Stanwood et al. | 380/255 |

* cited by examiner

*Primary Examiner* — Kodzovi Acolatse
(74) *Attorney, Agent, or Firm* — Han IP Corporation; Andy M. Han (57) ABSTRACT

The present disclosure outlines mechanisms, systems, methods, techniques and devices that reposition a RMC symbol in a TDD frame. In one aspect, a method queues data transmission units (DTUs) for transmission in a TDD OFDM communication system, with each of the DTUs occupying a single symbol partially or fully, or multiple symbols, of a series of symbols in a TDD frame. The method also forms a management symbol for transmission in a $k^{th}$ symbol position of the series of symbol positions, k>1. The method further transmits the symbols sequentially in the TDD frame.

17 Claims, 7 Drawing Sheets

D: Dowstream symbol
U: Upstream symbol
R: RMC symbol
G: Gap

DTUs carried by these symbols can be ACKed or NACKED by the following RMC symbol in the same frame

Top: Downstream RMC symbol aligned to the first symbol position in a TDD frame
Bottom: Downstream RMC symbol delayed by 4 symbols.

FRAMING MECHANISM FOR TIME-DIVISION-DUPLEX OFDM COMMUNICATION SYSTEMS

CROSS REFERENCE TO RELATED PATENT APPLICATION(S)

This application claims the priority benefit of U.S. Provisional Patent Application No. 61/641,199, filed May 1, 2012, which is incorporated by reference in its entirety.

BACKGROUND

1. Technical Field

The present disclosure generally relates to the field of digital communication and, more particularly, to a time-division-duplex (TDD) orthogonal frequency-division multiplexing (OFDM) communication system.

2. Description of the Related Art

In a modern point-to-point TDD OFDM communications system, such as a G.fast system that is undergoing standardization process at the International Telecommunication Union (ITU) Telecommunication Standardization Sector (ITU-T), a time domain signal consists of a combination of upstream symbols and downstream symbols. The switching time between upstream and downstream symbols should be minimized or unnecessary data bandwidth would be wasted. The basic transmission unit in G.fast is called a "frame". A frame consists of a series of symbols in one transmit direction (e.g., from point A to point B) followed by a series of symbols in the other transmit direction (e.g., from point B to point A). If the transmission is from FTU-O (i.e., central office of a service provider) to FTU-R (i.e., customer premises) this is referred to as the downstream direction. If the transmission is from FTU-R to FTU-O this is referred to as the upstream direction.

As described herein, the term "symbol position" is used to represent a specific symbol in an upstream or a downstream transmission. For example, a symbol position of 5 in a downstream transmission is the $5^{th}$ symbol from the beginning of the downstream transmission.

For purposes such as retransmission acknowledgment or fast on-line reconfiguration to accommodate a rapid noise change experienced on the communication channel, it is desirable to have a dedicated management channel separate from the payload (DTU carrying) channel. The name of this management channel is called the RMC (robust management channel) herein. The specific management channel symbol is called a RMC symbol. The naming of this management channel and corresponding symbol thereof is irrelevant to the inventive concept of the present disclosure, although the term "RMC" is used herein to denote a management channel having the functionality described herein. The RMC is transmitted at a fixed symbol position in both upstream and downstream directions and positioned within one symbol for each direction, so there is one RMC symbol upstream and one RMC symbol downstream in every frame.

A RMC symbol can be a unique symbol or shares a symbol with payload data. The content of the RMC symbol could be protected by high-redundancy (e.g., low coding rate) forward error corrections (FECs) and/or high signal-to-noise ratio (SNR) margins since the RMC symbol carries critical operation and management information. It could also use a known bit-loading pattern that does not require any handshake between the FTU-R and FTU-O devices in showtime. Showtime refers to an operation state in which DTUs are transmitted.

One major function of the RMC symbol is carrying the acknowledgement (ACK) information for the retransmission mechanism, similar to the retransmission-return-channel (RRC) defined in G.998.4. Typically in frame-based systems, management data is inserted at the beginning of transmission for each direction to align with the physical layer. However, doing so might affect the performance of the system if the processing time in the digital domain occupies a period of time for multiple symbols. An example is ITU-T G.9960 standard where the time gap between the transmission and the corresponding acknowledgement is defined as IFG (inter-frame-gap). In G.9960 a typical value of inter-frame gap (IFG) is around a time period equivalent to three to six symbols.

SUMMARY

Various embodiments of mechanisms, systems, methods, techniques and devices that reposition a management symbol in a TDD frame are disclosed herein.

In one aspect, a method may include: queuing data transmission units (DTUs) for transmission in a time-division-duplex (TDD) orthogonal frequency-division multiplexing (OFDM) communication system, each of the DTUs occupying a single symbol partially or fully, or multiple symbols, of a series of contiguous symbols in a TDD frame; forming a management symbol, e.g., a RMC symbol, for transmission in a $k^{th}$ symbol position of the series of symbols, k>1; and transmitting the symbols sequentially in the TDD frame.

In one embodiment, the TDD frame may include a group of contiguous OFDM symbols transmitted in a downstream direction following or followed by a group of contiguous OFDM symbols transmitted in an upstream direction.

In one embodiment, the TDD frame may further include a time gap between the group of contiguous OFDM symbols transmitted in one direction and the group of contiguous OFDM symbols transmitted in the other direction.

In one embodiment, the management symbol may contain acknowledgement information for retransmission, configuration information for physical medium dependent (PMD) layer, or both.

In one embodiment, the configuration information for PMD layer may include information related to forward error correction (FEC), bit-loading for a transmitter, bit-loading for a receiver, or any combination thereof.

In one embodiment, the management symbol may occupy a single symbol.

In one embodiment, the management symbol may include a dedicated OFDM symbol that is shared with one or more DTU(s).

In one embodiment, the method may transmit the management symbol in either or both of a downstream direction and an upstream direction once per TDD frame.

In one embodiment, the method may transmit the management symbol in the $k^{th}$ symbol position in either or both of a downstream direction and an upstream direction in the TDD frame.

In one embodiment, the method may further include: optimizing the symbol position k for the management symbol based on various criteria or constraints such as retransmission latency and memory size. The retransmission latency is introduced when one or more DTUs are not received correctly by the receiver and needs to be transmitted again. The value k might not be unique and might be different for upstream and downstream directions respectively.

In another aspect, a communication device may include a memory unit and a processing unit. The memory unit may be configured to store data, one or more sets of instructions, or both. The processing unit may be coupled to access the memory unit, and may be configured to perform a number of operations. The operations may include: queuing DTUs for transmission in a TDD OFDM communication system, each of the DTUs occupying a single symbol partially or fully, or multiple symbols, of a series of contiguous symbols in a TDD frame; forming a management symbol, e.g., a RMC symbol, for transmission in a $k^{th}$ symbol position of the series of symbols, k>1; and transmitting the symbols sequentially in the TDD frame.

In one embodiment, the TDD frame may include a group of contiguous OFDM symbols transmitted in a downstream direction following or followed by a group of contiguous OFDM symbols transmitted in an upstream direction with a time gap between the group of contiguous OFDM symbols transmitted in one direction and the group of contiguous OFDM symbols transmitted in the other direction.

In one embodiment, the TDD frame may include a group of contiguous OFDM symbols transmitted in an upstream direction following or followed by a group of contiguous OFDM symbols transmitted in a downstream direction without a time gap between the group of contiguous OFDM symbols transmitted in one direction and the group of contiguous OFDM symbols transmitted in the other direction.

In one embodiment, the management symbol may contain acknowledgement information for retransmission, configuration information for PMD layer, or both, and wherein the configuration information for PMD layer comprises information related to FEC, bit-loading for a transmitter, bit-loading for a receiver, or any combination thereof.

In one embodiment, the management symbol may occupy a single symbol.

In one embodiment, the management symbol may include a dedicated OFDM symbol that is shared with one or more DTU(s).

In one embodiment, the processing unit may be configured to transmit the management symbol in either or both of a downstream direction and an upstream direction once per TDD frame.

In one embodiment, the processing unit may be configured to transmit the management symbol in the $k^{th}$ symbol position in either or both of a downstream direction and an upstream direction in the TDD frame.

In one embodiment, the processing unit may be further configured to optimize the symbol position k for the management symbol based on various criteria or constraints such as retransmission latency and memory size. The retransmission latency is introduced when one or more DTUs are not received correctly by the receiver and needs to be transmitted again. The value k might not be unique and might be different for upstream and downstream direction.

This summary is provided to introduce concepts relating to repositioning a management symbol in a TDD frame. Some embodiments of the mechanism, techniques, methods, systems and devices are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure.

DETAILED DESCRIPTION OF PREFERRED EMBODIMENTS

Overview

Figure 1:
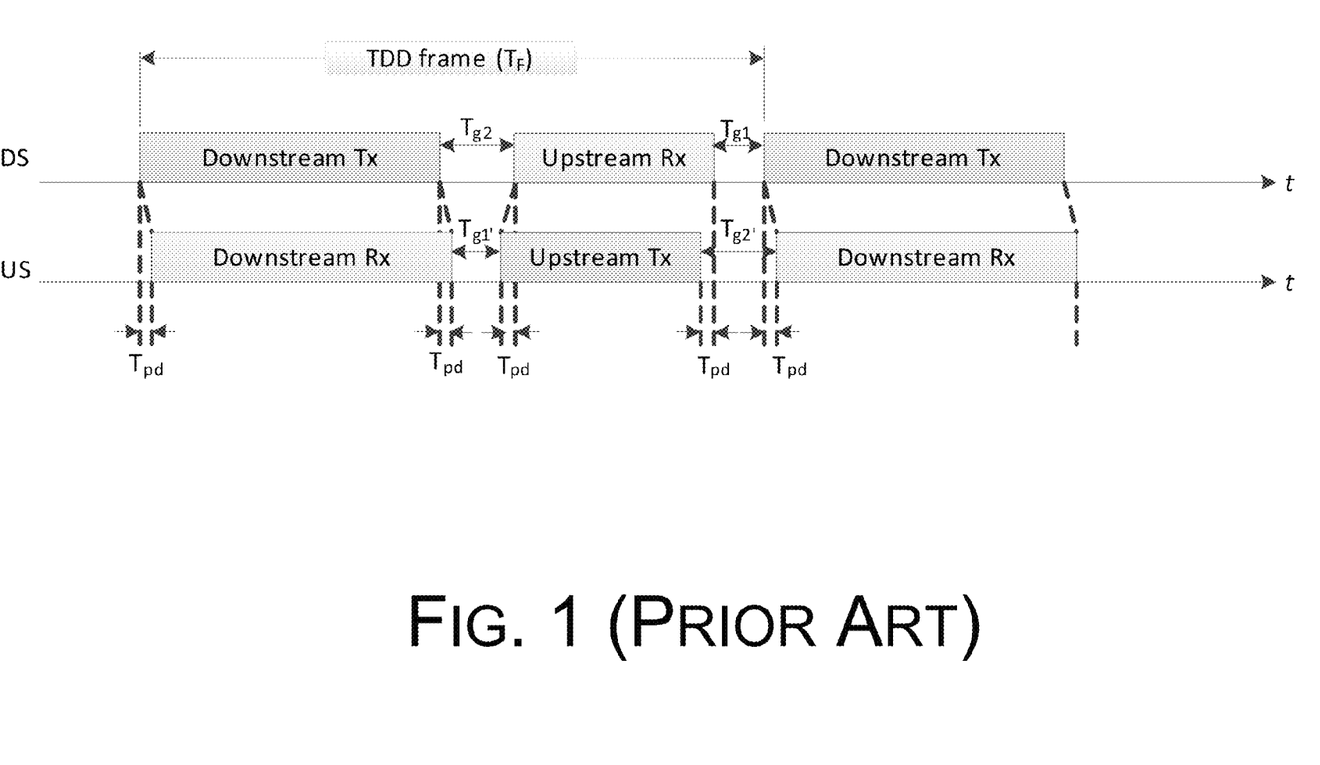
FIG. 1 is a diagram of a G.fast frame according to the ITU-T standards up to date.
Figure 2:
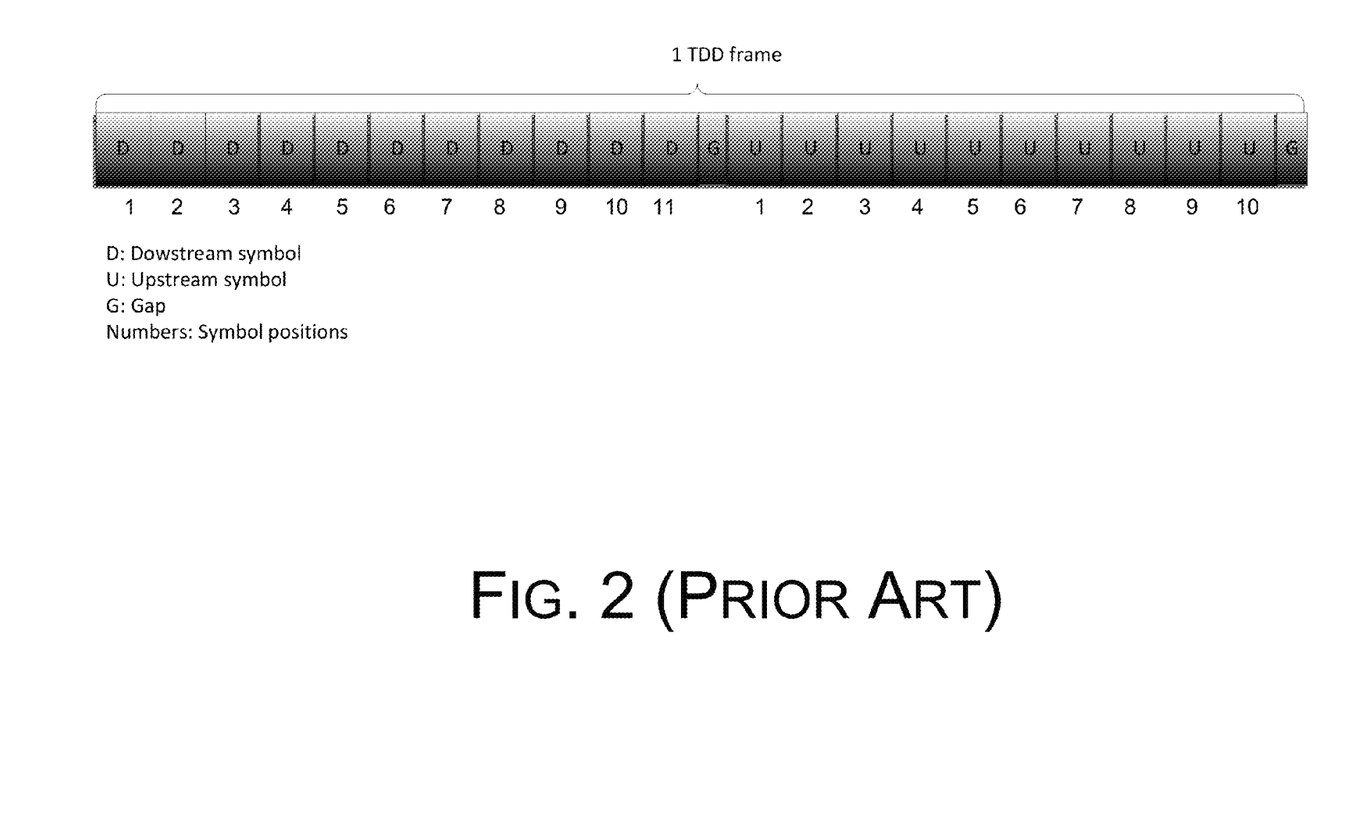
FIG. 2 is a diagram of a conventional TDD frame.

A G.fast frame is divided by upstream and downstream time slots (symbols) and might further contains some overhead such as upstream/downstream hardware switch time gaps $T_{g1}$, $T_{g2}$, $T_{g1'}$, $T_{g2'}$, as illustrated in FIG. 1. The downstream transmission and upstream transmission contain an integer number of OFDM symbols. FIG. 2 illustrates a simplified TDD frame with downstream/upstream transmission symbol positions shown in the TDD frame. To simplify the diagram, it is assumed that the time gaps are the same for both downstream-to-upstream transition and upstream-to-downstream transition, which case is not necessarily true. As shown in FIG. 2, the TDD frame has a group of eleven contiguous symbol positions (numbered 1 through 11) for transmission of eleven symbols in the downstream (D) direction, and has a group of ten contiguous symbol positions (numbered 1 through 10) for transmission of ten symbols in the upstream (U) direction. FIG. 2 also shows a time gap (G) between the group of downstream symbols and the group of upstream symbols.

G.fast uses a retransmission scheme to protect the communication system against impulse noises similar to G.998.4 for very-high-bit-rate digital subscriber line 2 (VDSL2) systems. User data (payload) are encoded into codewords (e.g., Reed-Solomon code) and then grouped and mixed with some auxiliary data to form a data transmission unit (DTU), which is a basic payload data transmission unit. The receiver either acknowledges a good reception of a DTU by sending an ACK to the transmitter or, alternatively, by sending a negative acknowledgement (NACK) to the transmitter to indicate a bad reception of a DTU.

An important parameter for retransmission is called "roundtrip" and is defined in G.993.4 as follows. The roundtrip in each direction is split into two parts: one due to the transmitter of the DTUs, called transmitter half-roundtrip ($HRT_{tx}$), and one due to the receiver of the DTUs, called receiver half roundtrip and noted ($HRT_{rx}$). Both half roundtrips have a part expressed in discrete multi-tone (DMT) symbol denoted as $HRT_{txS}$ and $HRT_{rxS}$, and a part computed in DTU denoted as $HRT_{txD}$ and $HRT_{rxD}$.

The symbol part of the receiver half roundtrip, $HRT_{rxS}$, is defined as the maximal time in DMT symbol measured at the U interface between the last received bit of the DTU with absolute number k+$HRT_{rxD}$ and the transmission of the first RRC containing information on the DTU with absolute number k. The value is rounded up to the nearest integer.

The symbol part of the transmitter half roundtrip, $HRT_{txS}$, is defined as the maximal time in DMT symbol measured at the U interface between the reception of the first RRC containing the request for retransmission of the DTU with absolute number k and the first bit of the DTU transmitted $HRT_{txD}$ DTUs before the actual retransmission of the DTU transmitted with the absolute number k. This value assumes that the retransmitted DTU is sent as soon as possible, i.e., is not delayed by the transmitter state machine, and is not delayed by the transmission of the current DTU over the U interface. The value is rounded up to the nearest integer.

In G.fast and VDSL2 terminologies the U interface represents the physical medium (i.e., copper wires) of the communications channel. The roundtrip time or the half-roudtrip time involves a pipelined processing stages such as DTU processing, fast Fourier transform (FFT), frequency domain equalization (FEQ), forward-error-correction (FEC) code decoding, ACK/NACK data generation, constellation mapping, inverse FFT (IFFT), etc. and may consume the amount of time equivalent to multiple symbols. For example, the reference half-roundtrip delay for a profile 30a G.993.2 VDSL2 system is 12 symbols. Although it is possible to optimize the transmitting/receiving processing stages to shorten the processing time, the amount of time required can be still significant (e.g., 4~6 symbols).

If the RMC symbol is placed in the first time slot of the transmission of a frame, it follows that the data unit that enters the U interface later than $HRT_{txS}$-th symbol position of a transmission in a specific direction is not acknowledged with the possibly shortest time. This may result in delayed retransmission which in turn would cause a problem of increased traffic latency. A delayed ACK might also imply a higher memory demand to store the outstanding DTUs that are not acknowledged.

Figure 3:
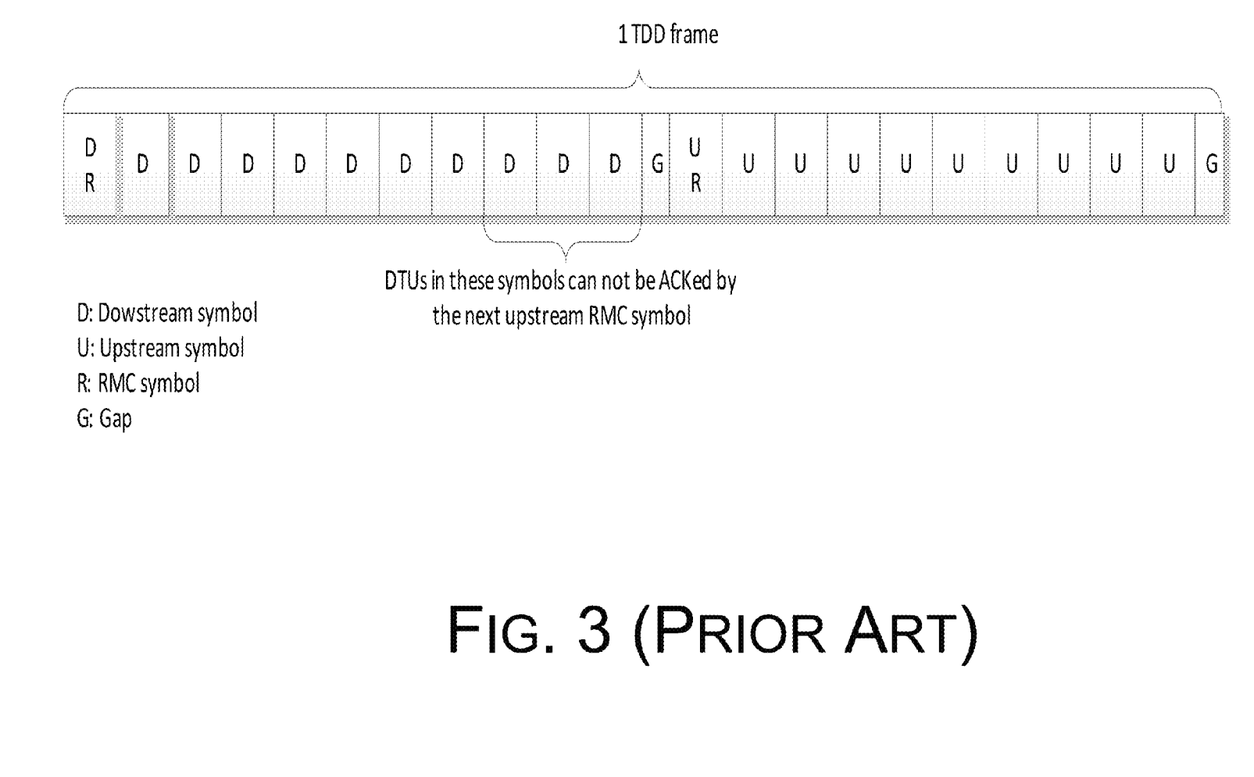
FIG. 3 is a diagram of a conventional TDD frame with a RMC symbol.

As shown in FIG. 3, a RMC symbol is placed in the first symbol position, for transmission in both the downstream and upstream directions. Assuming a $HRT_{txS}$ of 4 symbols, the DTUs transmitted in the downstream direction, that are less than 4 symbols before the upstream transmission begins, would not be ACKed or NACKed due to insufficient processing time.

Example Implementation

Figure 4:
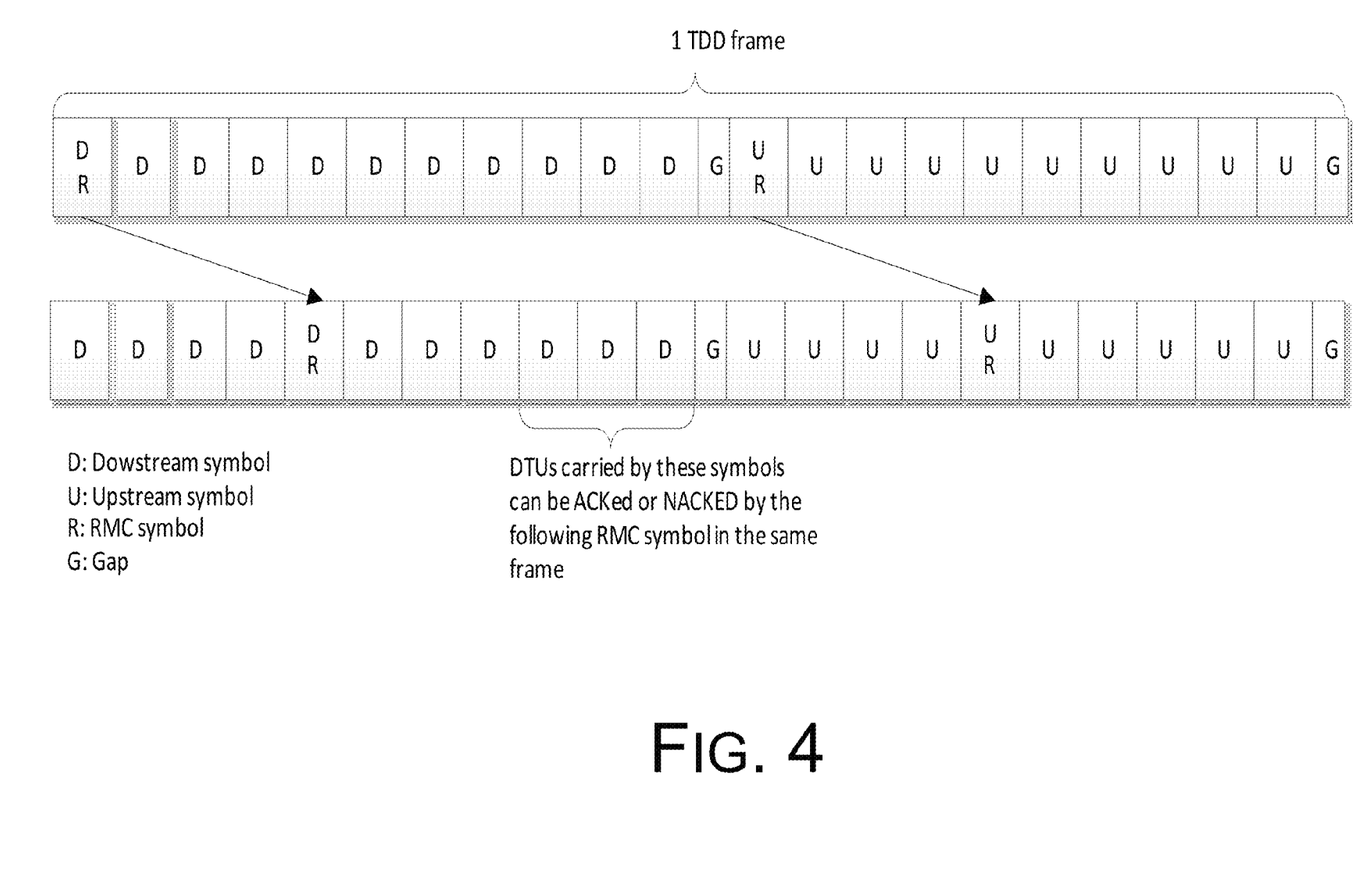
FIG. 4 is a diagram of a TDD frame with a repositioned RMC symbol in accordance with an embodiment of the present disclosure.

FIG. 4 illustrates a TDD frame with a repositioned RMC symbol in accordance with an embodiment of the present disclosure.

By shifting the RMC symbol to be larger or equal to $HRT_{txS}$, the aforementioned problem can be solved completely. By repositioning the RMC symbol in a TDD frame, the retransmission latency can be minimized. Notably, the technique is applicable to both the downstream and upstream directions.

Figure 5:
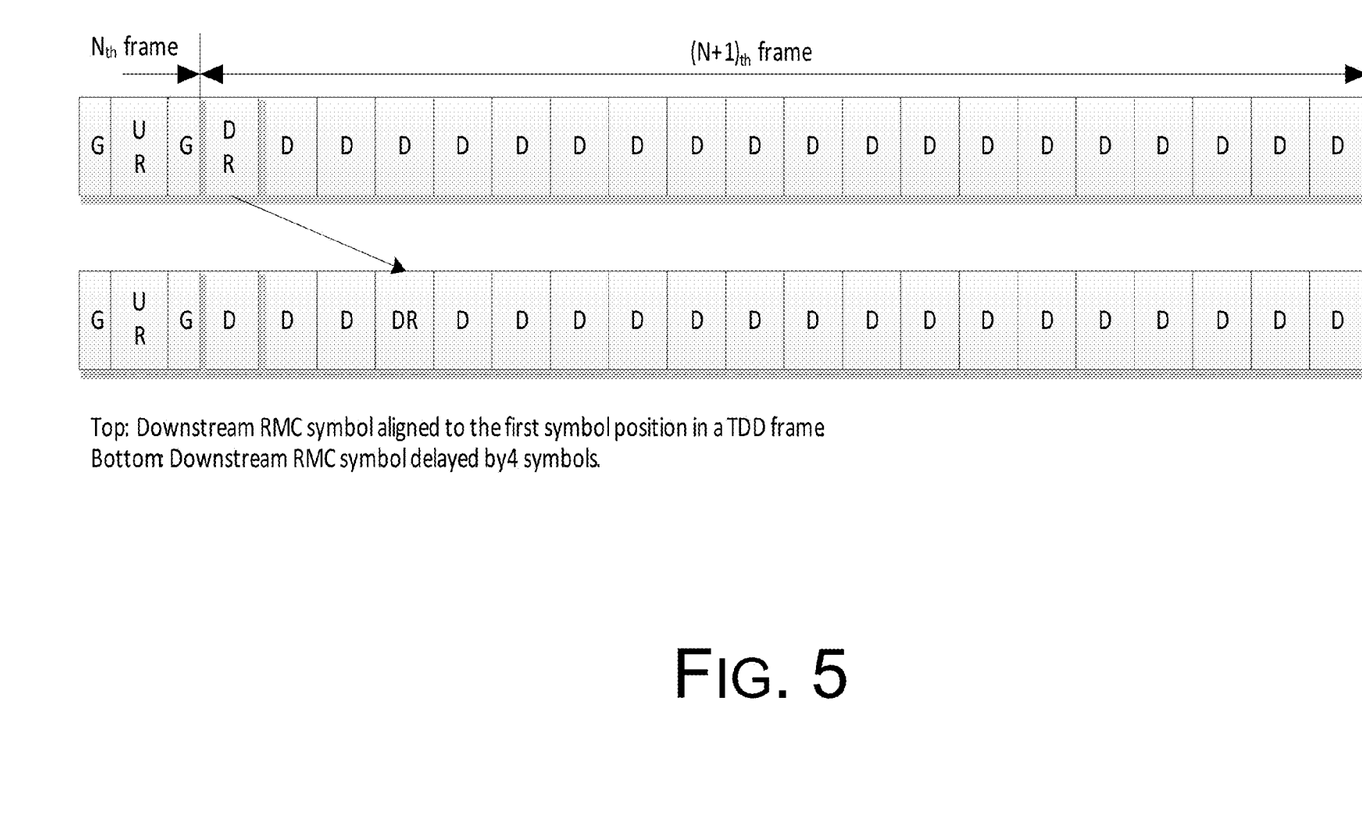
FIG. 5 is a diagram of repositioning a RMC symbol in a TDD frame in accordance with an embodiment of the present disclosure.

FIG. 5 illustrates repositioning of a RMC symbol in a TDD frame in accordance with an embodiment of the present disclosure.

More specifically, FIG. 5 shows another example that demonstrates how the delayed RMC symbol will help improve the retransmission performance. In this extremely asymmetric example, only one symbol is allocated to the upstream direction in a TDD frame. Consequently, the position of the upstream RMC symbol is not optimum. This degrades the performance of the downstream retransmission mechanism. However, by delaying the RMC symbol in the downstream direction, the latency in the upstream direction can be reduced by one full frame when retransmission occurs.

In FIG. 5, the top frame represents a frame with the RMC symbol aligned to the first symbol position in the downstream direction. Assuming some DTUs are transmitted in the upstream symbol in the $n^{th}$ frame, the DTUs cannot be ACKed or NACKed by the RMC symbol in the $(N+1)^{th}$ frame due to insufficient processing time. If the downstream RMC symbol in the $(N+1)^{th}$ frame is delayed by 4 symbols as shown in the bottom frame then all DTUs sent in the upstream symbol in the $N^{th}$ frame can be ACKed or NACKed by the RMC symbol in the $(N+1)^{th}$ frame. This advantageously saves one frame of latency under retransmission.

Example Device

Figure 6:
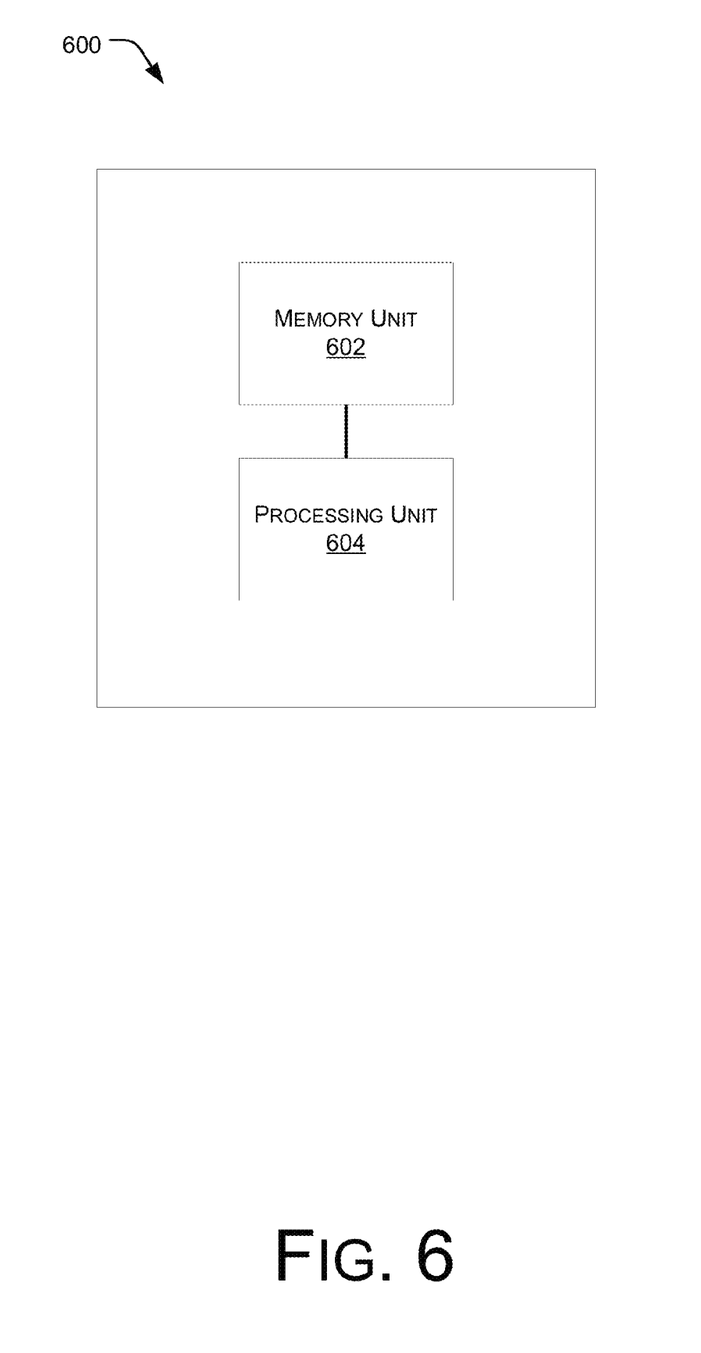
FIG. 6 is a processing device in accordance with an embodiment of the present disclosure.

FIG. 6 illustrates a communication device 600 in accordance with an embodiment of the present disclosure.

Communication device 600 is configured to implement systems and methods in accordance with the present disclosure. Communication device 600 includes a memory unit 602 and a processing unit 604. Communication device 600 may be, for example, a communication processor or chipset implemented in a communication apparatus such as a gateway, router, switch or the like in a TDD OFDM communication system. In some embodiments, communication device 600 includes more than one processing unit 604 and/or more than one memory unit 602. For simplicity, the description hereinafter refers to examples in which communication device 600 includes one processing unit 604 that performs the described operations.

In one example, the memory unit 602 may be configured to store data, one or more sets of instructions, or both. The processing unit 604 may be coupled to access the memory unit 602, and may be configured to perform a number of operations. The operations may include: queuing DTUs for transmission in a TDD OFDM communication system, each of the DTUs occupying a single symbol partially or fully, or multiple symbols, of a series of contiguous symbols in a TDD frame; forming a management symbol, e.g., a RMC symbol, for transmission in a $k^{th}$ symbol position of the series of symbols, k>1; and transmitting the symbols sequentially in the TDD frame.

In one embodiment, the TDD frame may include a group of contiguous OFDM symbols transmitted in a downstream direction following or followed by (i.e., transmitted after or before) a group of contiguous OFDM symbols transmitted in an upstream direction with a time gap between the group of contiguous OFDM symbols transmitted in one direction and the group of contiguous OFDM symbols transmitted in the other direction.

In one embodiment, the TDD frame may include a group of contiguous OFDM symbols transmitted in an upstream direction following or followed by (i.e., transmitted after or before) a group of contiguous OFDM symbols transmitted in a downstream direction without a time gap between the group of contiguous OFDM symbols transmitted in one direction and the group of contiguous OFDM symbols transmitted in the other direction.

In one embodiment, the management symbol may contain acknowledgement information for retransmission, configuration information for PMD layer, or both, and wherein the configuration information for PMD layer comprises information related to FEC, bit-loading for a transmitter, bit-loading for a receiver, or any combination thereof.

In one embodiment, the management symbol may occupy a single symbol.

In one embodiment, the management symbol may include a dedicated OFDM symbol that is shared with one or more DTUs.

In one embodiment, the processing unit 604 may be configured to transmit the management symbol in either or both of a downstream direction and an upstream direction once per TDD frame.

In one embodiment, the processing unit 604 may be configured to transmit the management symbol in the $k^{th}$ symbol position in either or both of a downstream direction and an upstream direction in the TDD frame.

In one embodiment, the processing unit 604 may be further configured to optimize the symbol position k for the management symbol based on various criteria or constraints such as retransmission latency and memory size. The value k might not be unique and might be different for upstream and downstream directions.

Example Process

Figure 7:
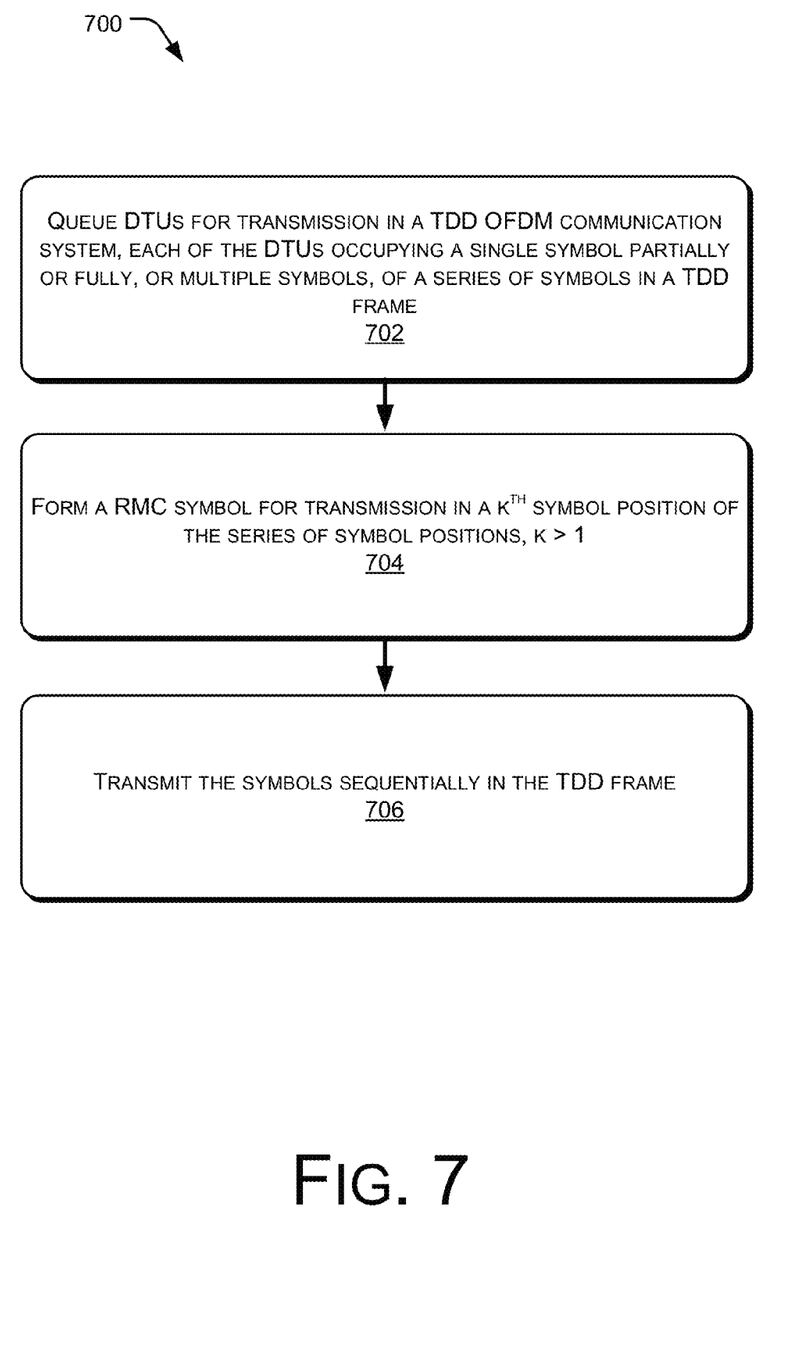
FIG. 7 is a flowchart of a process in accordance with an embodiment of the present disclosure.

FIG. 7 is a flowchart of a process 700 in accordance with an embodiment of the present disclosure. Process 700 includes one or more operations, actions, or functions as illustrated by one or more of blocks 702, 704 and 706. Although illustrated as discrete blocks, various blocks may be divided into additional blocks, combined into fewer blocks, or eliminated, depending on the desired implementation. Process 700 may be implemented by one or more processors including, for example, processing unit 604 of communication device 600. Moreover, some or all of the operations of process 700 may be carried out by processing unit 604. For illustrative purposes, the operations described below are performed by processing unit 604 of communication device 600 as shown in FIG. 6.

At 702, DTUs are queued for transmission in a TDD OFDM communication system, with each of the DTUs occupying a single symbol partially or fully, or multiple symbols, of a series of symbols in a TDD frame.

At 704, a management symbol, e.g., a RMC symbol, is formed for transmission in a $k^{th}$ symbol position of the series of symbol positions, k>1.

At 706, the symbols above are transmitted sequentially in the TDD frame.

In one embodiment, the TDD frame may include a group of contiguous OFDM symbols transmitted in a downstream direction following or followed by (i.e., transmitted after or before) a group of contiguous OFDM symbols transmitted in an upstream direction.

In one embodiment, the TDD frame may further include a time gap between the group of contiguous OFDM symbols transmitted in one direction and the group of contiguous OFDM symbols transmitted in the other direction.

In one embodiment, the management symbol may contain acknowledgement information for retransmission, configuration information for PMD layer, or both.

In one embodiment, the configuration information for PMD layer may include information related to FEC, bit-loading for a transmitter, bit-loading for a receiver, or any combination thereof.

In one embodiment, the management symbol may occupy a single symbol.

In one embodiment, the management symbol may include a dedicated OFDM symbol that is shared with one or more DTUs.

In one embodiment, process 700 may transmit the management symbol in either or both of a downstream direction and an upstream direction once per TDD frame.

In one embodiment, process 700 may transmit the management symbol in the $k^{th}$ symbol position in either or both of a downstream direction and an upstream direction in the TDD frame.

In one embodiment, process 700 may further include: optimizing the symbol position k for the management symbol based on various criteria or constraints such as retransmission latency and memory size. The value k might not be unique and might be different for upstream and downstream directions.

Additional Notes

Embodiments of the present disclosure are not limited to those described herein. The actual design and implementation of the proposed techniques, methods, devices and systems in accordance with the present disclosure may vary from the embodiments described herein. Those ordinarily skilled in the art may make various deviations and improvements based on the disclosed embodiments, and such deviations and improvements are still within the scope of the present disclosure. Accordingly, the scope of protection of a patent issued from the present disclosure is determined by the claims as follows.

In the above description of exemplary implementations, for purposes of explanation, specific numbers, materials configurations, and other details are set forth in order to better explain the present disclosure, as claimed. However, it will be apparent to one skilled in the art that the claimed subject matter may be practiced using different details than the exemplary ones described herein. In other instances, well-known features are omitted or simplified to clarify the description of the exemplary implementations.

What is claimed is:

1. A method, comprising:
   queuing data transmission units (DTUs) for transmission in a time-division-duplex (TDD) orthogonal frequency-division multiplexing (OFDM) communication system, each of the DTUs occupying a single symbol partially or fully, or multiple symbols, of a series of symbols in either a downstream or an upstream direction in a TDD frame;
   forming a management symbol containing acknowledgement information for retransmission for transmission in a $k^{th}$ symbol position of the series of symbols, k>1;
   determining a value of the $k^{th}$ symbol position for the management symbol based on a processing delay time required to process a received DTU and a time to generate the acknowledgement information for retransmission;
   adjusting the value of the $k^{th}$ symbol position for the management symbol based on changes in various criteria or constraints, the various criteria or constraints including retransmission latency and memory size, wherein the value of k is not unique and is different for the downstream direction and the upstream direction; and
   transmitting the symbols sequentially in the TDD frame.

2. The method of claim 1, wherein the TDD frame comprises a group of contiguous OFDM symbols transmitted in a downstream direction following or followed by a group of contiguous OFDM symbols transmitted in an upstream direction.

3. The method of claim 2, wherein the TDD frame further comprises a time gap between the group of contiguous OFDM symbols transmitted in one direction and the group of contiguous OFDM symbols transmitted in the other direction.

4. The method of claim 1 wherein the management symbol contains acknowledgement information for retransmission, configuration information for physical medium dependent (PMD) layer, or both.

5. The method of claim 4, wherein the configuration information for PMD layer comprises information related to forward error correction (FEC), bit-loading for a transmitter, bit-loading for a receiver, or any combination thereof.

6. The method of claim 1, wherein the management symbol occupies a single symbol.

7. The method of claim 1, wherein the management symbol comprises a dedicated OFDM symbol that is shared with one or more DTUs.

8. The method of claim 1, wherein the transmitting comprises transmitting the management symbol in either or both of a downstream direction and an upstream direction once per TDD frame.

9. The method of claim 1, wherein the transmitting comprises transmitting the management symbol in the kth symbol position in either or both of a downstream direction and an upstream direction in the TDD frame.

10. A communication device, comprising:
a memory unit configured to store data, one or more sets of instructions, or both; and
a processing unit coupled to access the memory unit, the processing unit configured to perform operations comprising:
queuing data transmission units (DTUs) for transmission in a time-division-duplex (TDD) orthogonal frequency-division multiplexing (OFDM) communication system, each of the DTUs occupying a single symbol partially or fully, or multiple symbols, of a series of symbols in a TDD frame;
forming a management symbol containing acknowledgement information for retransmission for transmission in a $k^{th}$ symbol position of the series of symbol positions, k>1;
determining a value of the $k^{th}$ symbol position for the management symbol based on a processing delay time required to process a received DTU and a time to generate the acknowledgement information for retransmission;
adjusting the value of the $k^{th}$ symbol position for the management symbol based on changes in various criteria or constraints, the various criteria or constraint including retransmission latency and memory size, wherein the value of k is not unique and is different for the downstream direction and the upstream direction; and
transmitting the symbols sequentially in the TDD frame.

11. The communication device of claim 10, wherein the TDD frame comprises a group of contiguous OFDM symbols transmitted in a downstream direction following or followed by a group of contiguous OFDM symbols transmitted in an upstream direction with a time gap between the group of contiguous OFDM symbols transmitted in one direction and the group of contiguous OFDM symbols transmitted in the other direction.

12. The communication device of claim 10, wherein the TDD frame comprises a group of contiguous OFDM symbols transmitted in an upstream direction following or followed by a group of contiguous OFDM symbols transmitted in a downstream direction without a time gap between the group of contiguous OFDM symbols transmitted in one direction and the group of contiguous OFDM symbols transmitted in the other direction.

13. The communication device of claim 10, wherein the management symbol contains acknowledgement information for retransmission, configuration information for physical medium dependent (PMD) layer, or both, and wherein the configuration information for PMD layer comprises information related to forward error correction (FEC), bit-loading for a transmitter, bit-loading for a receiver, or any combination thereof.

14. The communication device of claim 10, wherein the management symbol occupies a single symbol.

15. The communication device of claim 10, wherein the management symbol comprises a dedicated OFDM symbol that is shared with one or more DTUs.

16. The communication device of claim 10, wherein the processing unit is configured to transmit the management symbol in either or both of a downstream direction and an upstream direction once per TDD frame.

17. The communication device of claim 10, wherein the processing unit is configured to transmit the management symbol in the kth symbol position in either or both of a downstream direction and an upstream direction in the TDD frame.

* * * * *